(12) United States Patent
LaMothe et al.

(10) Patent No.: US 8,157,657 B2
(45) Date of Patent: Apr. 17, 2012

(54) SELECTIVELY EXPANDABLE AND CONTRACTIBLE BARRIER

(75) Inventors: Eric LaMothe, Goodrich, MI (US); Robert Leslie Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 678 days.

(21) Appl. No.: 11/960,264

(22) Filed: Dec. 19, 2007

(65) Prior Publication Data

US 2009/0160136 A1 Jun. 25, 2009

(51) Int. Cl.
*F16D 3/00* (2006.01)
(52) U.S. Cl. .......... 464/145; 464/17; 277/635; 277/927
(58) Field of Classification Search .................. 464/15, 464/17, 139–146; 277/628, 634–636, 927, 277/928
See application file for complete search history.

(56) References Cited

U.S. PATENT DOCUMENTS

| | | | |
|---|---|---|---|
| 2,354,961 A | | 8/1944 | O'Donnell |
| 3,362,193 A | * | 1/1968 | Ritsema .......................... 464/146 |
| 3,381,987 A | * | 5/1968 | Husen .............................. 403/51 |
| 3,642,327 A | * | 2/1972 | Walther ...................... 301/108.1 |
| 3,817,057 A | * | 6/1974 | Orain ............................... 464/89 |
| 4,068,499 A | * | 1/1978 | Sharp ............................. 464/115 |
| 4,820,238 A | | 4/1989 | Uchida et al. |
| 6,251,021 B1 | * | 6/2001 | Jacob ............................. 464/145 |
| 6,530,843 B2 | | 3/2003 | Miller et al. |
| 6,540,616 B2 | | 4/2003 | Miller et al. |
| 6,793,581 B2 | | 9/2004 | Meyer et al. |
| 7,097,563 B2 | * | 8/2006 | Benson et al. ................... 464/17 |
| 2007/0093304 A1 | * | 4/2007 | Cermak ......................... 464/179 |

* cited by examiner

*Primary Examiner* — James Hewitt
*Assistant Examiner* — Jay R Ripley
(74) *Attorney, Agent, or Firm* — Jennifer M. Brumbaugh; Mick A. Nylander; Rader, Fishman & Grauer PLLC

(57) ABSTRACT

A barrier membrane assembly for sealing a constant velocity joint assembly includes at least one selectively expandable and contractible barrier membrane body. The barrier membrane body has no openings therethrough and may selectively expand and contract in response to operational pressures acting against the barrier membrane body.

15 Claims, 12 Drawing Sheets

SELECTIVELY EXPANDABLE AND CONTRACTIBLE BARRIER

TECHNICAL FIELD

The present disclosure generally relates to a barrier assembly, and more particularly, to a selectively expandable and contractible barrier that is permitted to expand in response to pressures within a constant velocity joint assembly.

BACKGROUND

Constant velocity joints are common components in automotive vehicles. Typically, constant velocity joints are employed where transmission of a constant velocity rotary motion is desired or required. Common types of constant velocity joints include plunging tripods, fixed tripods, plunging ball joints and fixed ball joints. These types of joints currently are used in front wheel drive vehicles or rear wheel drive vehicles, and on the propeller shafts found in rear wheel drive, all wheel drive and four wheel drive vehicles. Constant velocity joints are generally grease lubricated for life and sealed with sealing boots when used on drive shafts. Thus, constant velocity joints are sealed in order to retain grease inside the joint while keeping contaminants and foreign matter, such as dirt and water, out of the joint. To achieve this protection, the constant velocity joint is usually enclosed at the open end of the outer race by a sealing boot made of a rubber, thermoplastic, or silicone material. The opposite end of the outer race generally is enclosed by a dome or cap, known as a grease cap. A monoblock or integral stem and race design style does not use a grease cap, but is sealed by the internal geometry of the outer race. Sealing and protection of the constant velocity joint is necessary because contamination of the inner chamber may cause internal damage and destruction of the joint. Furthermore, once the inner chamber of the joint is lubricated, it is lubricated for life.

During operation, the constant velocity joint creates internal pressures in the inner chamber of the joint. The internal pressure is the result of increases in internal or external temperature. These pressures must be vented to the outer atmosphere in order to prevent pressure build-up. If the pressure build-up is allowed to reach a critical state, the boot, which protects the joint from contaminants and water, may deform, crack, deteriorate, or blow out, thus diminishing the life of the boot and losing its ability to properly seal the joint. A constant velocity joint is usually vented by placing a small hole generally in the center of the grease cap or at least one hole around the outer periphery of the boot neck. These methods of venting the pressure build up are sometimes not adequate because if the constant velocity joint is in a static state and not rotating the lubricating grease may settle in the vent hole and block or hinder its venting function and/or evacuate lubricant from the joint. This type of vent may also allow infiltration of contaminants. Once the internal pressure builds up, the joint may fail due to a ruptured boot or other catastrophe. Furthermore, the constant velocity joint, after running for long periods of time, may create very high temperatures along with high pressures which are vented through the current vent holes. However, if the constant velocity joint is submerged or saturated in water or other contaminants, the water will, via a rapid temperature change cause a vacuum, within the joint chamber and draw water into the constant velocity joint, thus contaminating the grease lubricant and reducing the life of the constant velocity joint.

Therefore, there is a need for a constant velocity joint that will prevent the build up of internal pressure while eliminating the possible ingress of contaminants from entering the constant velocity joint.

SUMMARY

A barrier membrane assembly for sealing a constant velocity joint assembly is disclosed. The barrier membrane includes at least one selectively expandable and contractible barrier membrane body. The barrier membrane body has no openings therethrough and may selectively expand and contract in response to operational pressures acting against the barrier membrane body.

In one embodiment, the barrier membrane is disposed within a constant velocity joint. In another embodiment, the constant velocity joint includes two barrier membranes, such as illustrated, for example, in FIGS. 9-14.

BRIEF DESCRIPTION OF THE DRAWINGS

The features of the present invention will become apparent from the subsequent description and appended claims, taken in conjunction with the accompanying drawings.

DETAILED DESCRIPTION

Figure 1:
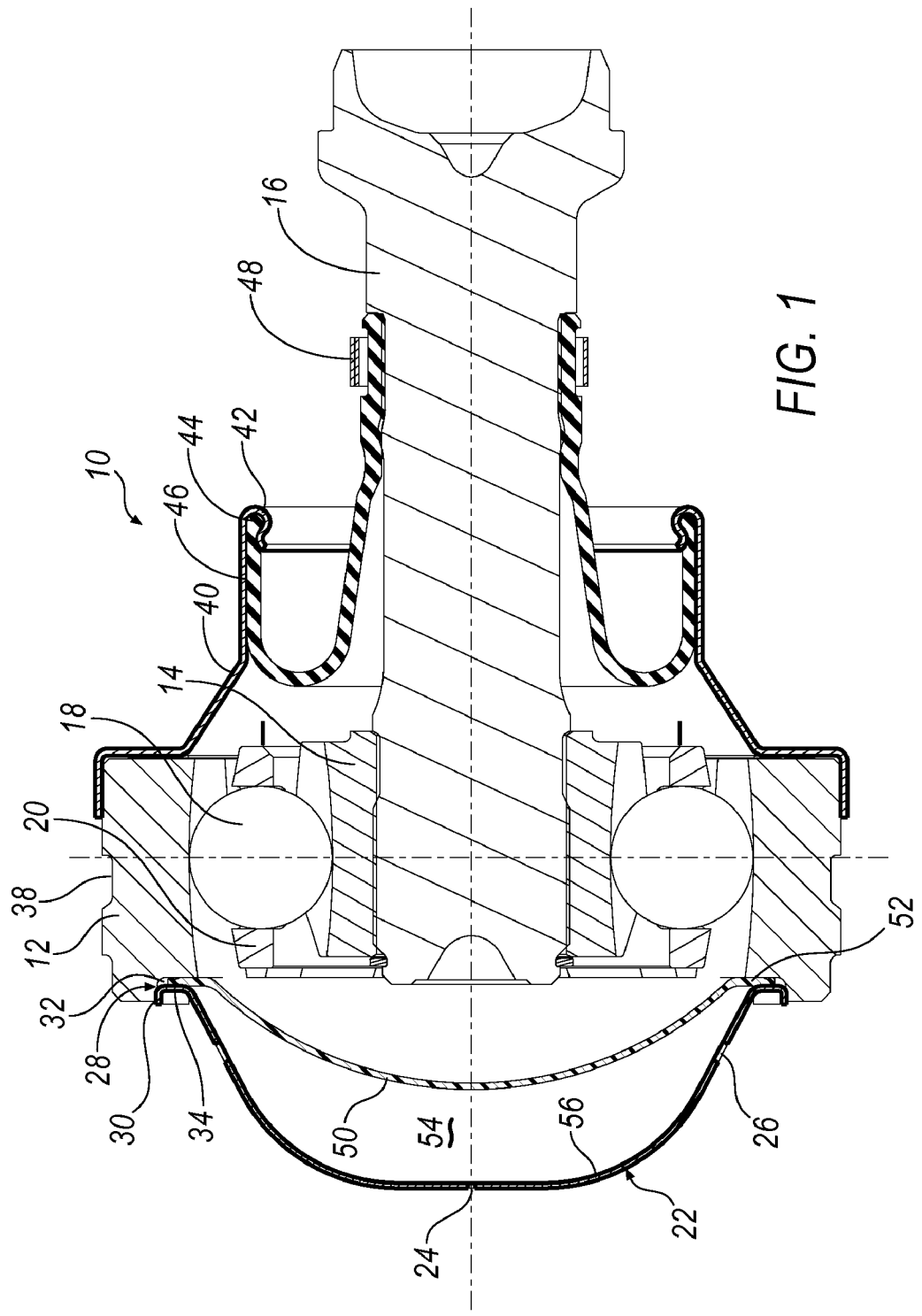
FIG. 1 is a cross-sectional view of an embodiment of a constant velocity joint assembly employing a barrier membrane.

Referring to the drawings, an embodiment of a constant velocity joint 10 according to the present invention is shown.

It should be noted that any type of constant velocity joint such as a plunging tripod, a fixed tripod, etc. may be used in connection with the present invention. For the convenience of the reader, like elements have been give the same element numbers through the drawings.

Referring to FIG. 1, the constant velocity joint 10 includes an outer race 12 with an inner race 14 located within the circumference of outer race 12. Inner race 14 is operably connected to a shaft 16. At least one rolling element 18 is in contact with both an inner surface of the outer race 12 and an outer surface of the inner race 14. The rolling element 18 is held in place by a cage 20. An optional end cap 22 is located on one end of the outer race 12. While the illustrative embodiment includes end cap 22, it is understood that end cap 22 is not required and may be eliminated in its entirety for some applications.

A selectively expandable and contractible first barrier membrane 50 is mounted to outer race 12. In one embodiment, first barrier membrane 50 includes a distal outer edge 52 that extends radially outwardly from barrier membrane 50. At least a portion of distal outer edge 52 is disposed within groove 28. For example, as shown in FIG. 1, a portion of distal outer edge 52 is received within second leg 32 of groove 28 with a portion of distal end 34 of end cap 22.

Figure 2:
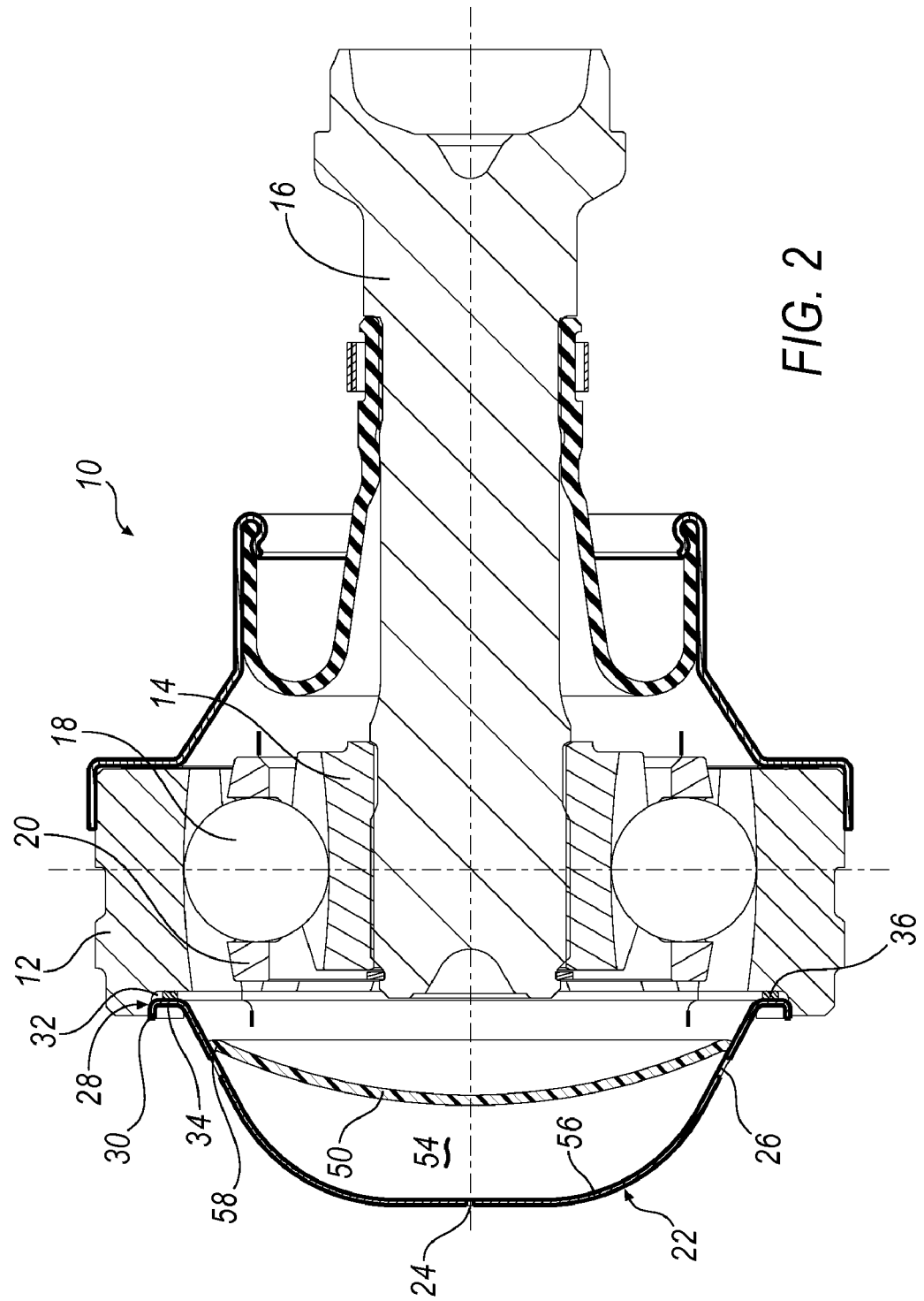
FIG. 2 is a cross-sectional view of a constant velocity joint assembly of FIG. 1, illustrating an alternative method of attaching the barrier membrane to the constant velocity joint.

In another embodiment, as shown in FIG. 2, barrier membrane 50 terminates in an outer edge 58. Outer edge 58 is fixedly attached to inner surface 56 of end cap 22 by bonding or other suitable methods. In this embodiment, a sealing member 36, such as an o-ring or the like, may be inserted within second leg 32 of groove 28 to assist in retaining end cap 22 within groove 28.

A boot cover 40 is positioned on an opposite end of the outer race 12 from end cap 22. One end of boot cover 40 is secured to outer race 12 by bonding, crimping or other suitable attachment techniques. In one embodiment, boot cover 40 includes a channel 42 on a periphery thereof. Within the channel 42, one end 44 of a boot 46 is disposed. In one embodiment, the boot 46 may be made of a neoprene material, however, it should be noted that any other type of soft rubber like or composite material may also be used. The opposite end of the boot 46 is secured to the shaft 16 by a clamp 48 or other available securing mechanism.

A selectively expandable and contractible first barrier membrane 50 is mounted to outer race 12. In one embodiment, first barrier membrane 50 includes a distal outer edge 52 that extends radially outwardly from barrier membrane 50. At least a portion of distal outer edge 52 is disposed within groove 28. For example, as shown in FIG. 1, a portion of distal outer edge 52 is received within second leg 32 of groove 30 with a portion of distal end 34 of end cap 22.

Figure 4:
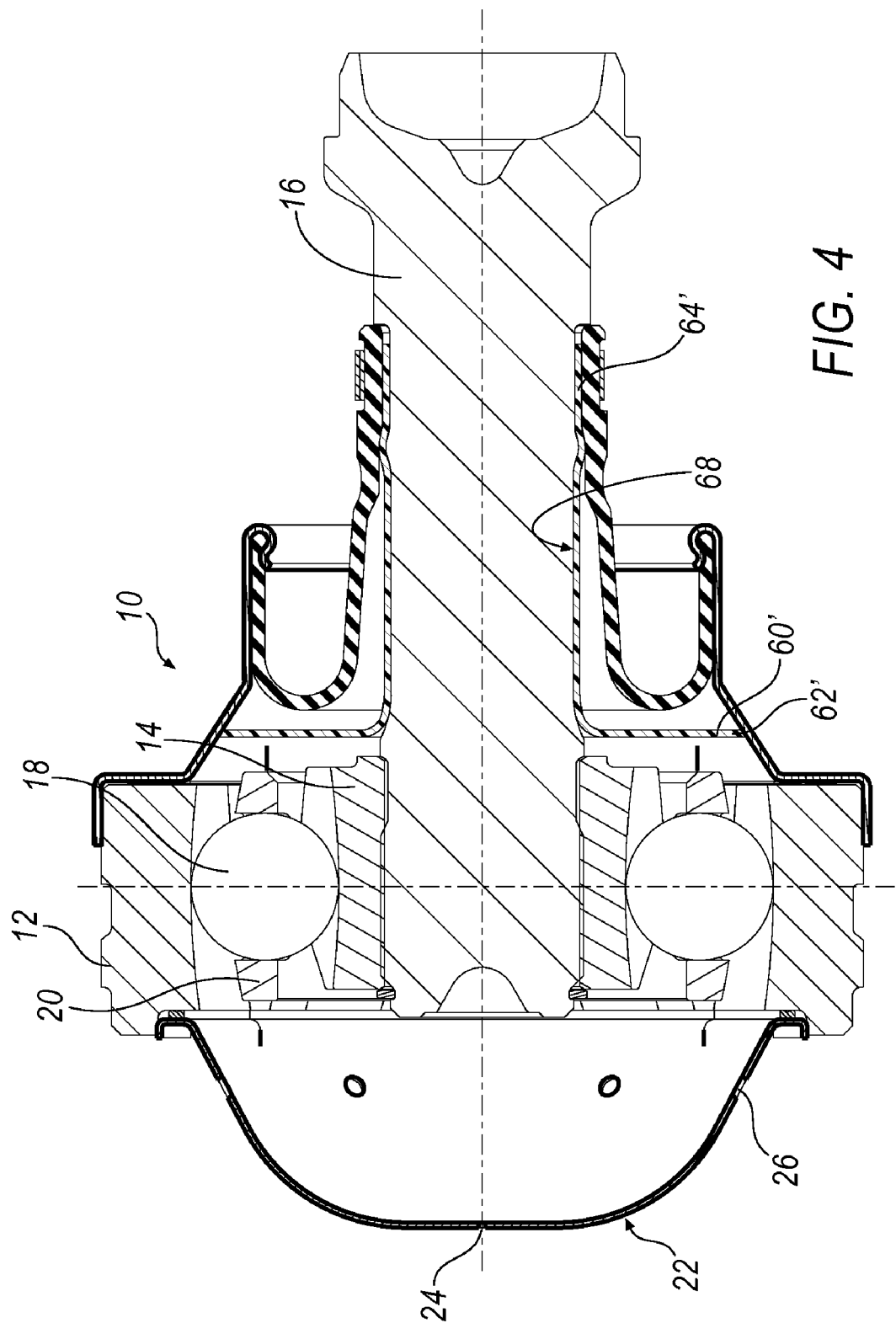
FIG. 4 is a cross-sectional view of a constant velocity joint employing an alternative embodiment of the second barrier membrane.

Another embodiment of second barrier member 60' is shown in FIG. 4. Second barrier member 60' is defined by a first end 62' and a second engagement portion 68. The first end 62' is bonded or otherwise attached to boot cover 40. The second engagement portion 68 extends along a portion of shaft 16. Second engagement portion 68 may be frictionally retained on shaft 16 by a clamp 48 or other suitable mechamsm.

In one embodiment, barrier membrane 50 extends substantially over the entire first end of constant velocity joint 10. An expansion space 54 is defined between an inner surface 56 of end cap 22 and barrier membrane 50. Barrier membrane 50 is designed to be at least substantially abrasion and wear resistant, as well as substantially elastic and impermeable. The barrier membrane 50 may be constructed of a natural or synthetic elastic material, such as neoprene, butylenes, styrene, silicone or other suitable material. Operation and function of barrier membrane 50 will be explained in further detail below.

Figure 3:
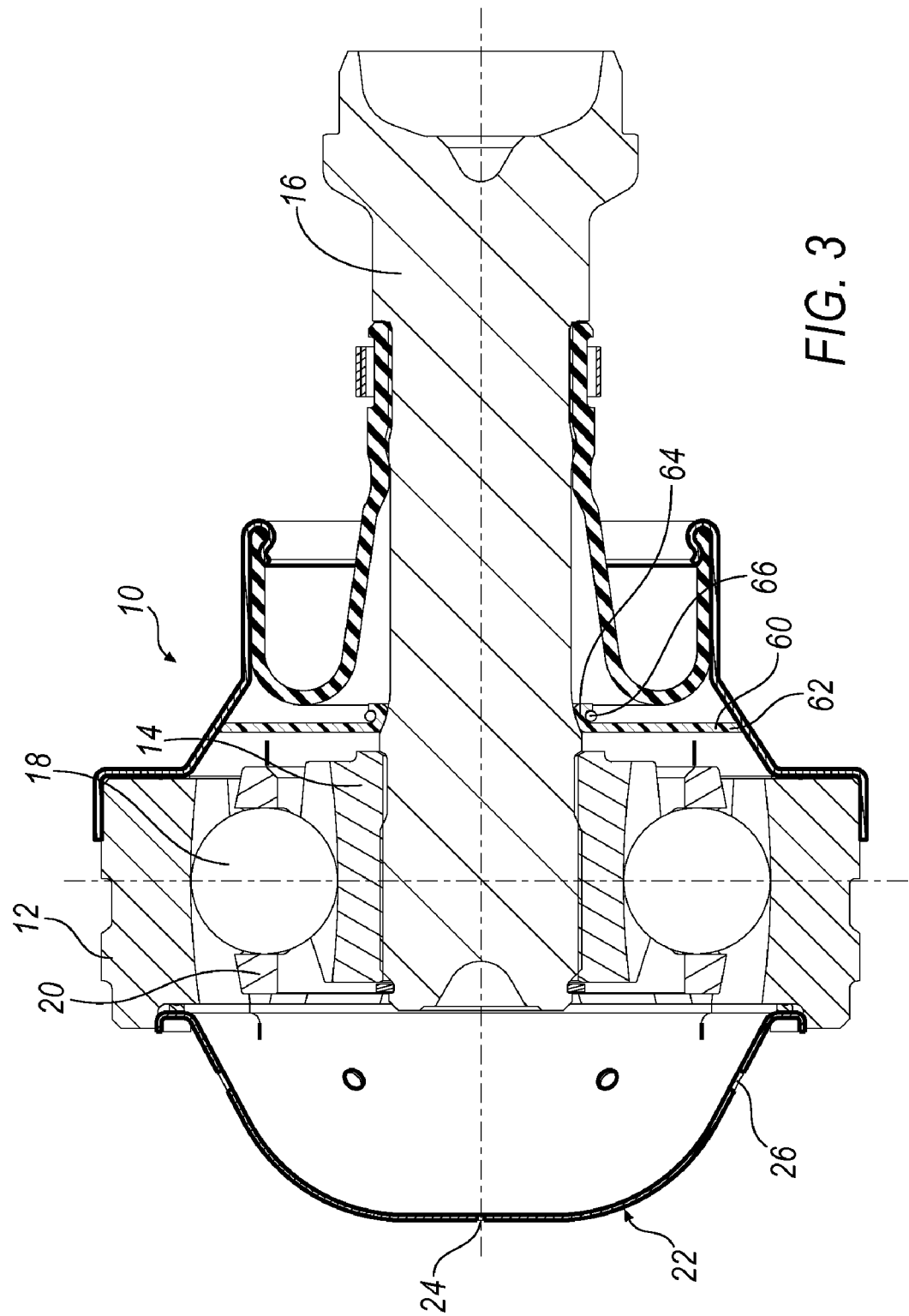
FIG. 3 is a cross-sectional view of a constant velocity joint employing a second barrier membrane.

In another embodiment, a second barrier membrane 60 is provided. Second barrier membrane 60 may be mounted on the second end of the constant velocity joint 10 assembly between the cage 20 and the boot 46. The second membrane may be of identical composition and properties as defined for barrier 48. An example of such an embodiment is shown in FIG. 3. In such an embodiment, barrier membrane 60 is disposed between boot cover 40 and shaft 16. A first end 62 is fixedly attached to boot cover 40, by bonding or other suitable methods. A second end 64 of membrane 60 is sealed around shaft 16 by a spring ring 66 or other suitable mechanism.

Another embodiment of second barrier member 60' is shown in FIG. 4. Second barrier member 60' is defined by a first end 62' and a second engagement portion 68. The first end 6' is bonded or otherwise attached to boot cover 40. The second engagement portion 68 extends along a portion of shaft 16. Second engagement portion 68 may be frictionally retained on shaft 16 by a clamp 48 or other suitable mechanism.

Figure 5:
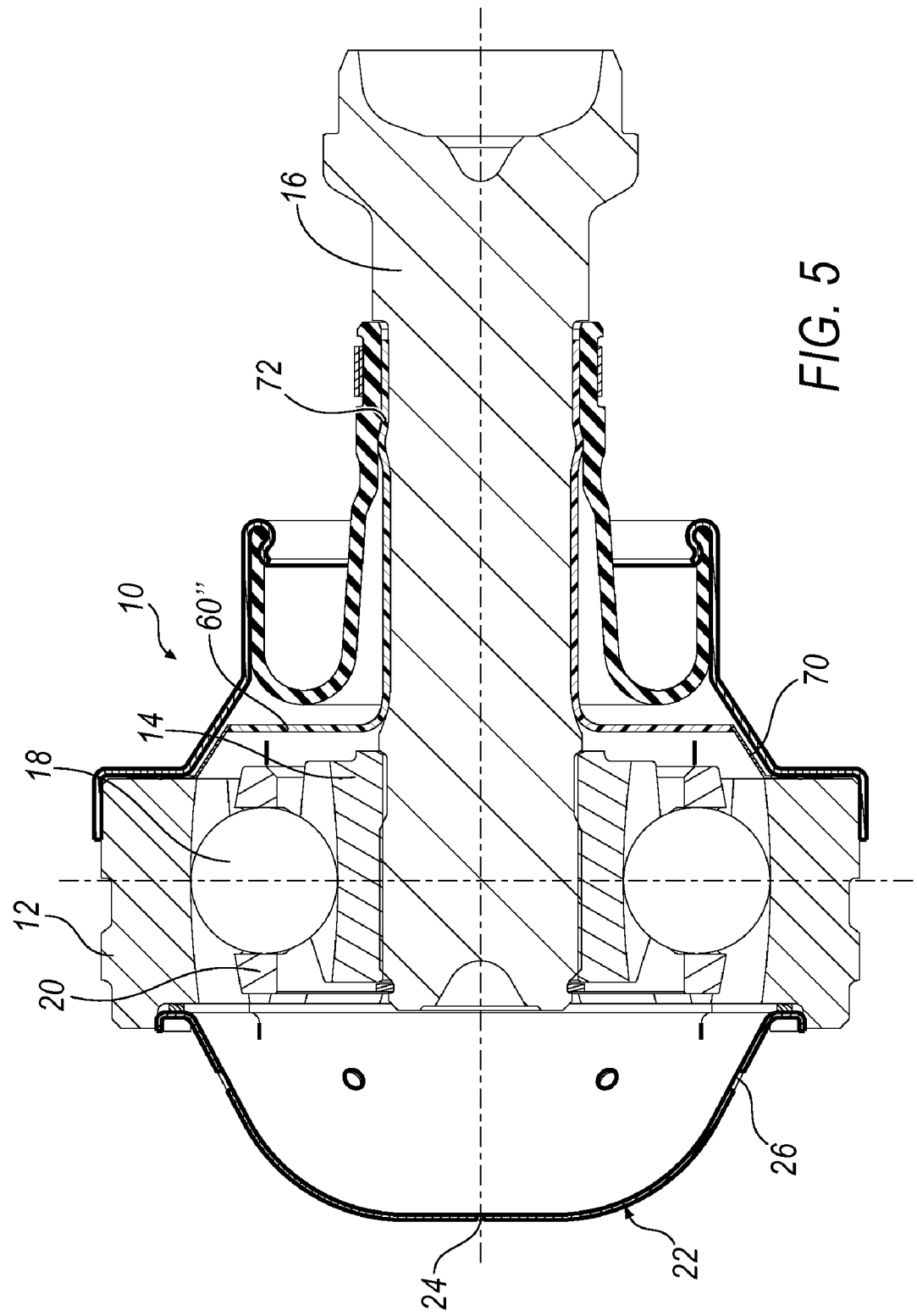
FIG. 5 is a cross-sectional view of a constant velocity joint employing a second alternative embodiment of the second barrier membrane.

Another embodiment of second barrier member 60" is shown in FIG. 5. Second barrier member 60" is defined by a first engagement portion 70 and a second engagement portion 72, with a barrier portion therebetween. The first engagement portion 70 is crimped between a portion of boot cover 40 and outer race 12. The second engagement portion 72 extends along a portion of shaft 16. Second engagement portion 72 may be frictionally retained on shaft 16 by a clamp 48 or other suitable mechanism.

Figure 8:
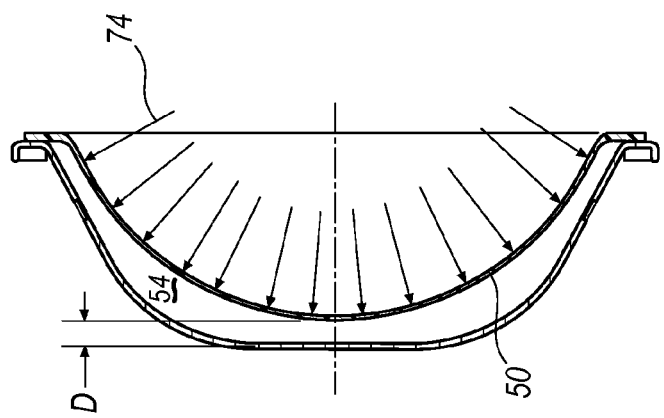
FIG. 8 is a detailed view of the barrier membrane of FIG. 6 under hard working conditions when the constant velocity joint is spinning at speed and the joint temperature is high.
Figure 7:
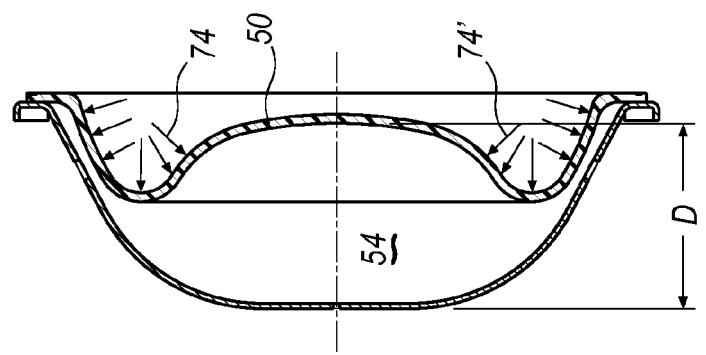
FIG. 7 is a detailed view of the barrier membrane of FIG. 6 at the start of operation of constant velocity joint before the temperature of the joint has reached normal operating level.
Figure 6:
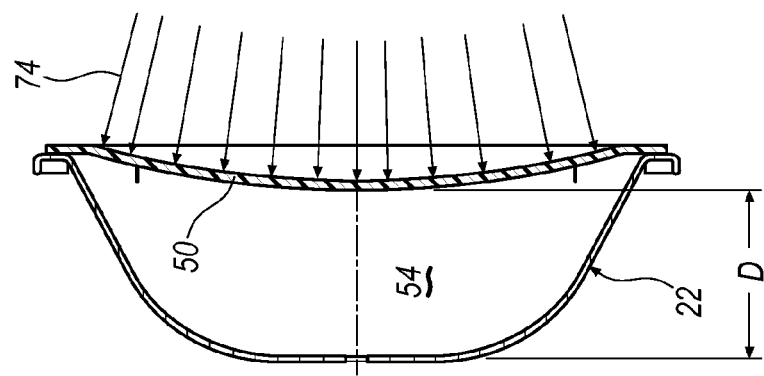
FIG. 6 is a detailed view of the barrier membrane of FIG. 1 before operation of the constant velocity joint.
Figure 9:
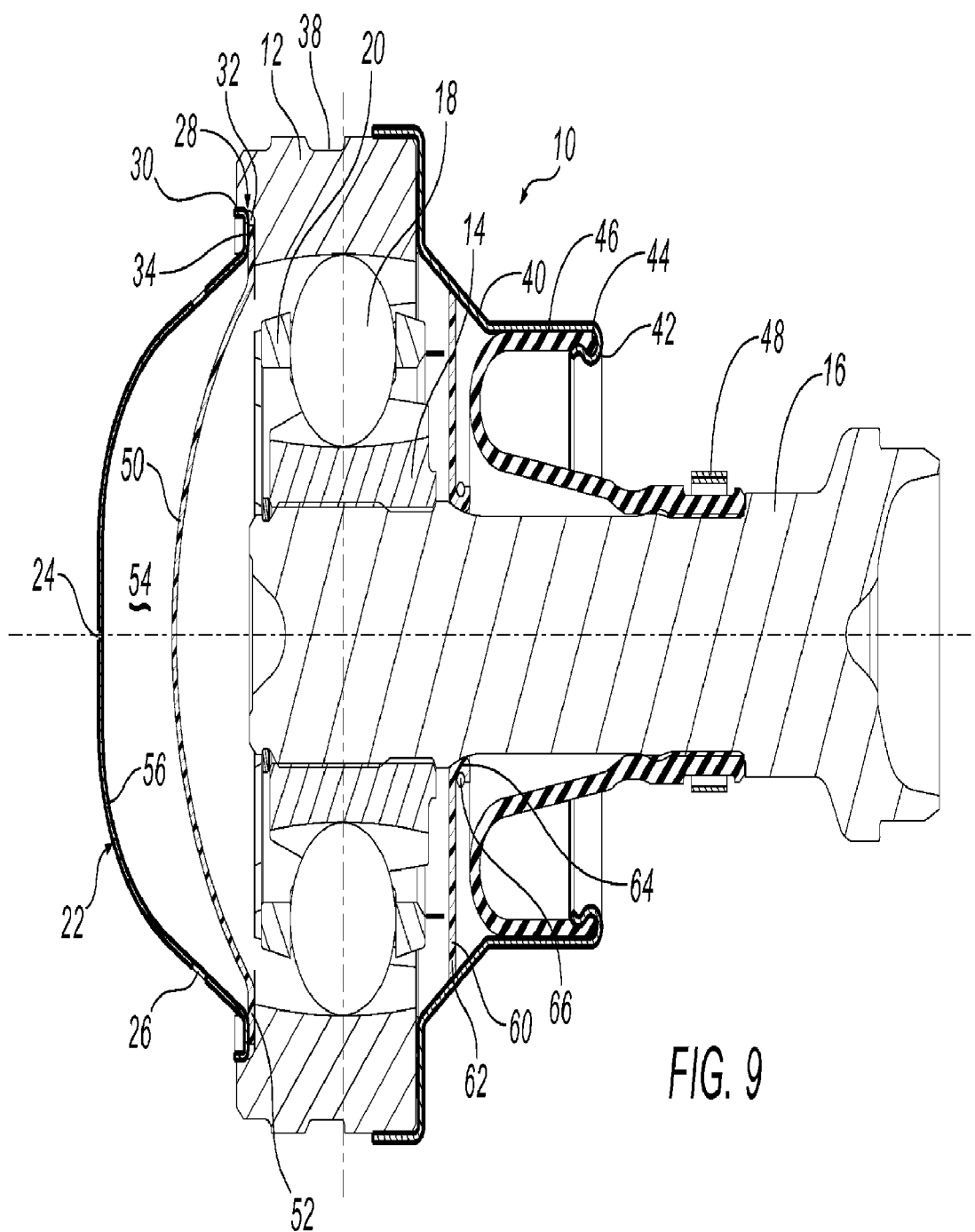
FIG. 9 is a cross-sectional view of a constant velocity joint assembly employing the barrier membranes illustrated in FIGS. 1 and 3.
Figure 10:
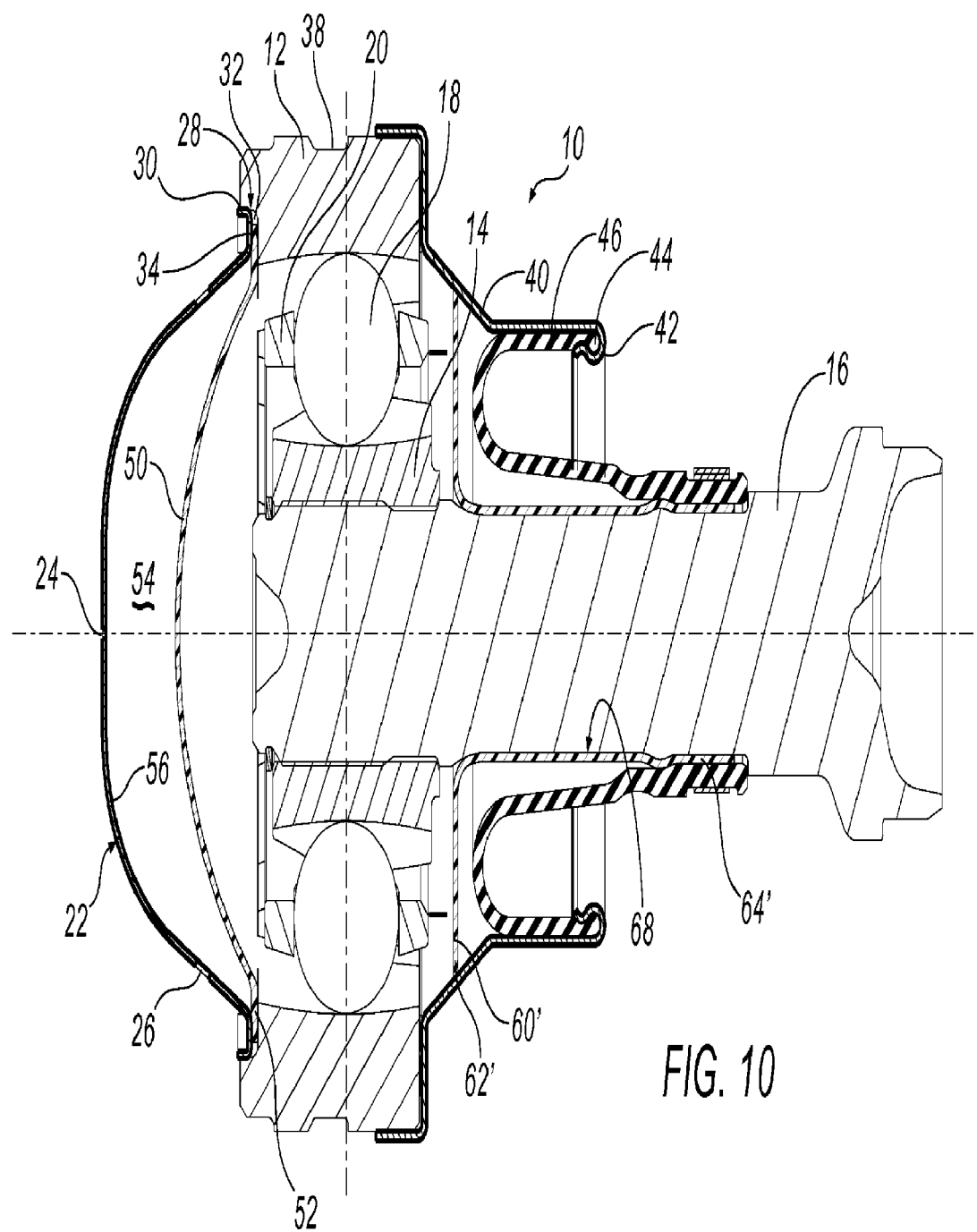
FIG. 10 is a cross-sectional view of a constant velocity joint assembly employing the barrier membranes illustrated in FIGS. 1 and 4.
Figure 11:
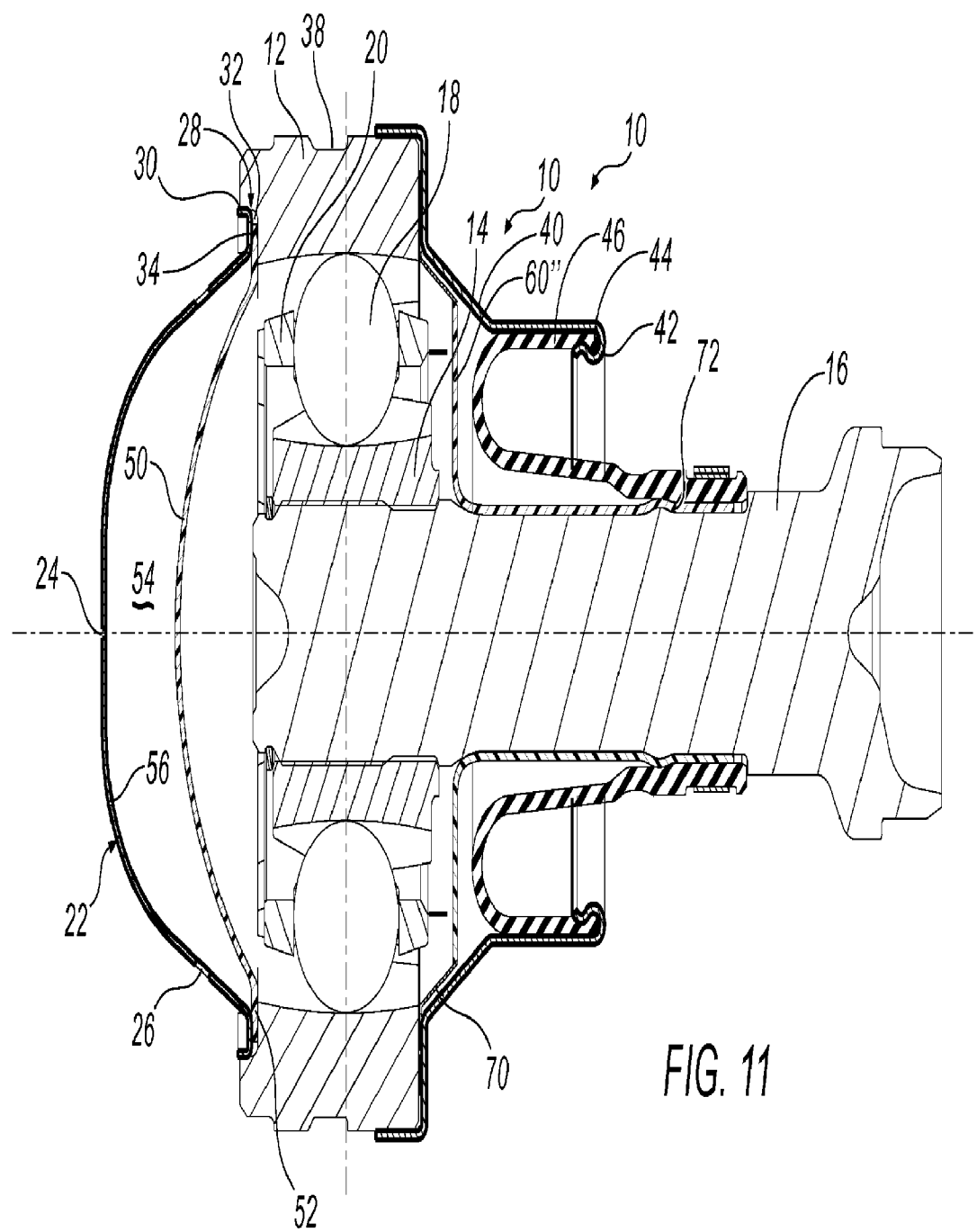
FIG. 11 is a cross-sectional view of a constant velocity joint assembly employing the barrier membranes illustrated in FIGS. 1 and 5.
Figure 12:
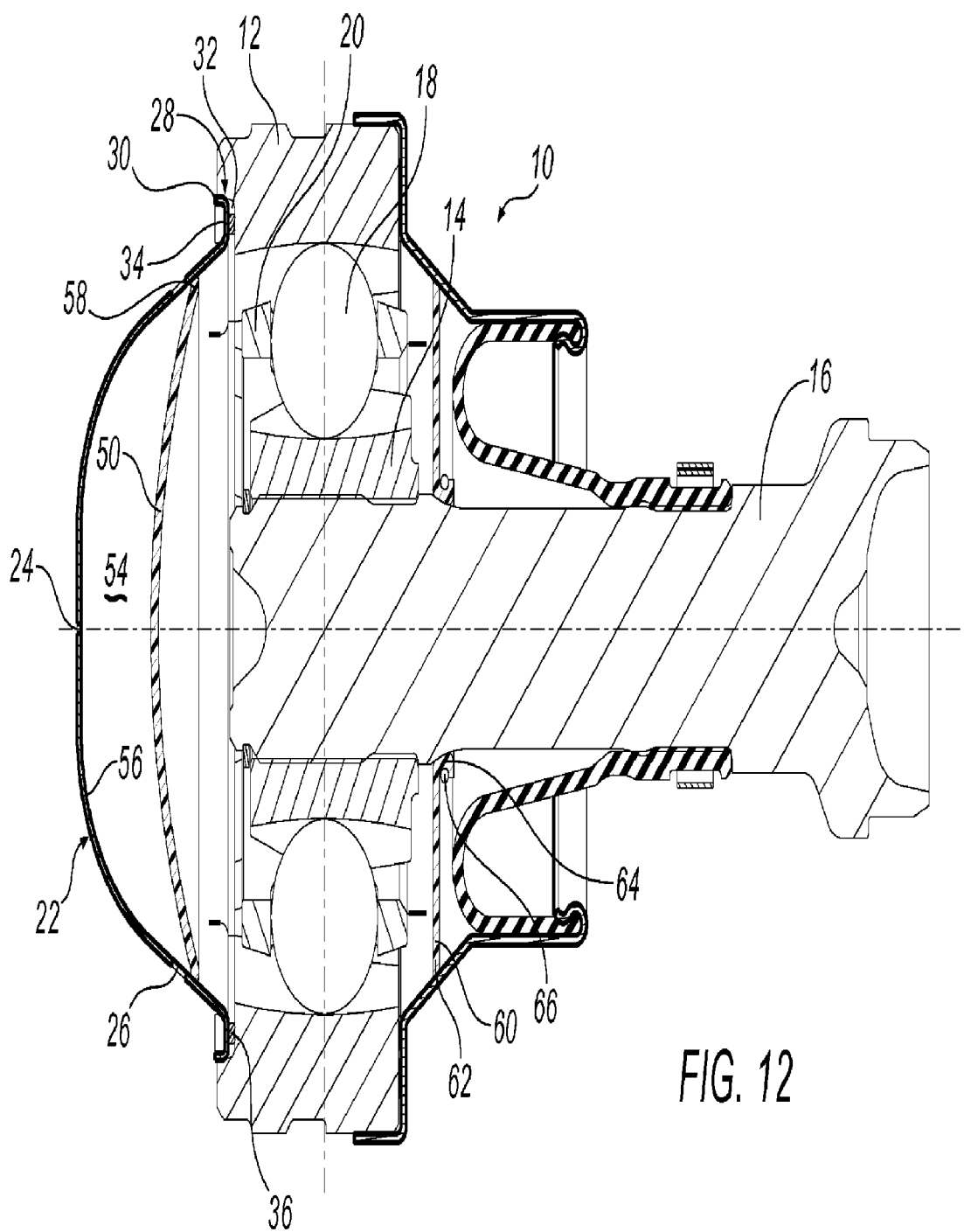
FIG. 12 is a cross-sectional view of a constant velocity joint assembly employing the barrier membranes illustrated in FIGS. 2 and 3.
Figure 13:
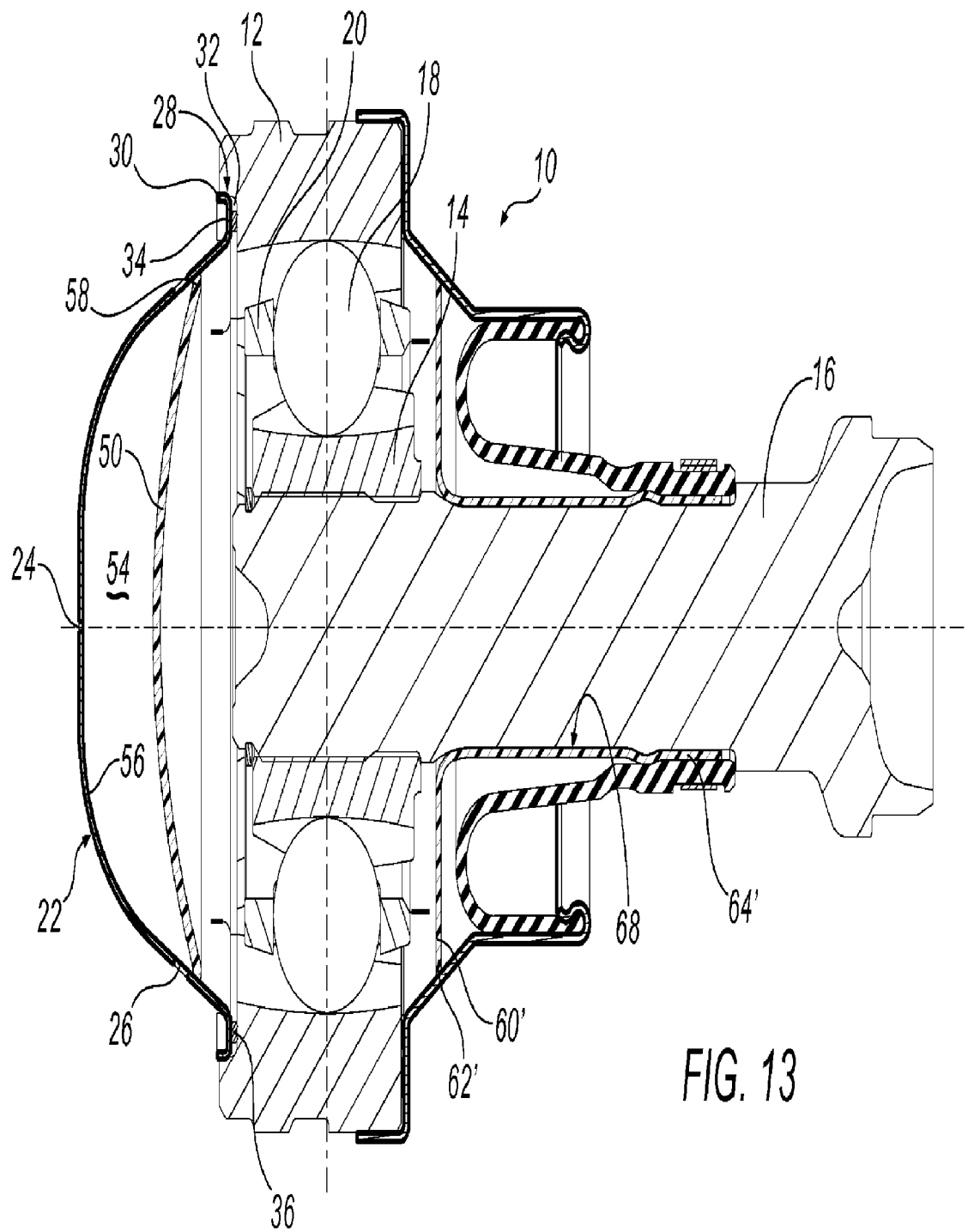
FIG. 13 is a cross-sectional view of a constant velocity joint assembly employing the barrier membranes illustrated in FIGS. 2 and 4.
Figure 14:
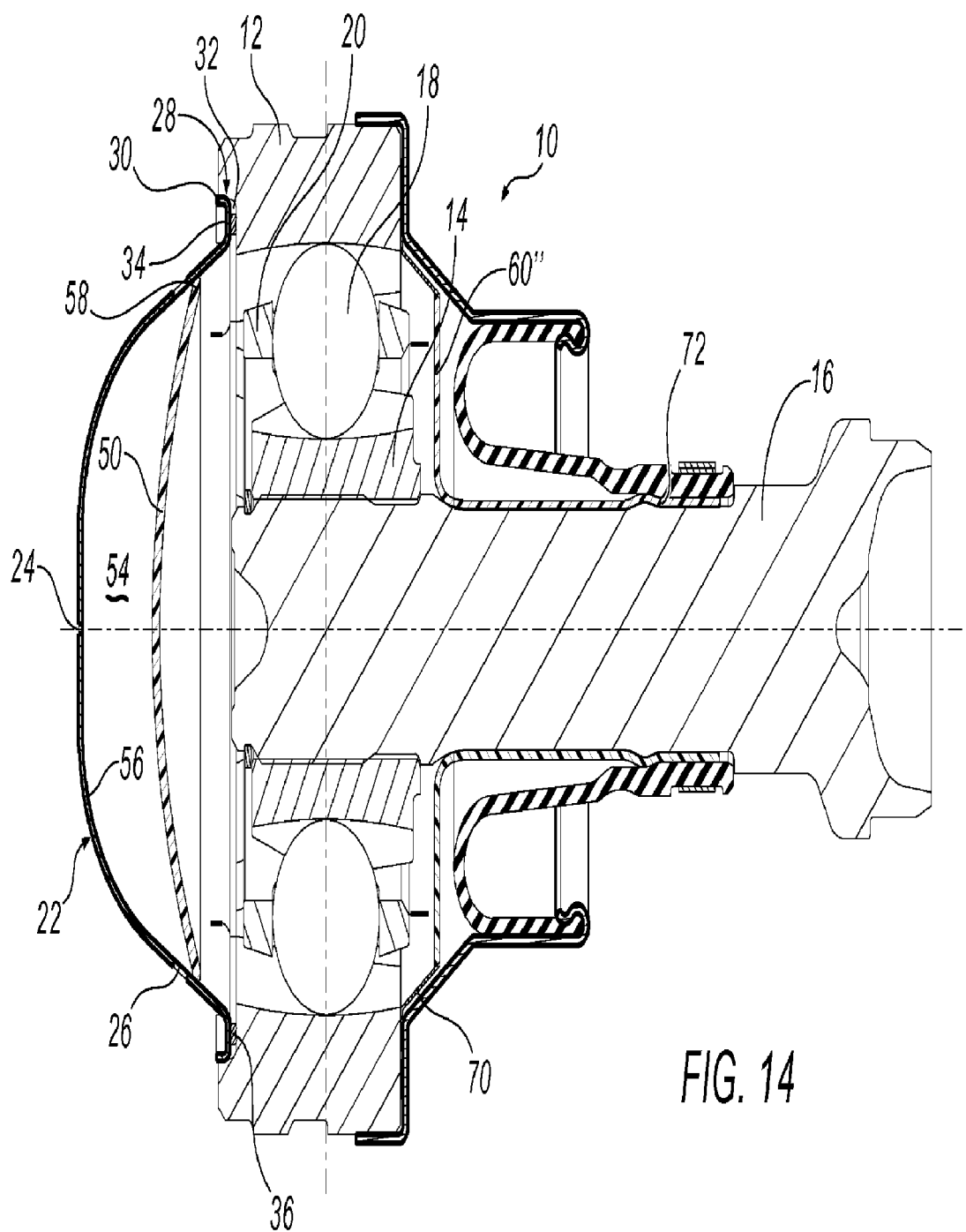
FIG. 14 is a cross-sectional view of a constant velocity joint assembly employing the barrier membranes illustrated in FIGS. 2 and 5.

Referring now to FIGS. 6-8, operation of first barrier membrane 50 will be explained in further detail. While FIGS. 6-8 are discussed with reference to first barrier membrane 50, it is understood that the principles of operation of first barrier membrane 50 are also applicable to second barrier membrane 60, 60', 60".

The constant velocity 10 joint is filled with a lubricant to reduce the internal temperature and lubricate the moving parts within the constant velocity joint 10. In one embodiment the lubricant is grease, which is placed within an inner chamber of the constant velocity joint 10 and is sealed thereafter via the boot cover 40 and end cap 22. Thus, when first barrier membrane 50 is positioned within the constant velocity joint assembly 10, it is understood that grease may be confined between barrier membrane 50 and boot cover 40. In those embodiments that employ a second barrier membrane 60, 60', 60", it is understood that grease may be confined between the barrier membranes 50 and 60, 60', 60". In this type of configuration, the amount of grease needed to fill the constant velocity joint assembly 10 is reduced.

Referring specifically to FIG. 6, prior to operation of constant velocity joint 10, a force (represented by arrows 74) from the grease and internal pressures on barrier membrane 50 is relatively moderate. Thus first barrier membrane 50 is in an unflexed state. In such a state, expansion space 54 is at its maximum, spanning a distance D.

When the vehicle is operating, the constant velocity joint 10 begins rotating. This rotation causes the grease and pressures to begin to build up along the circumferential edge of the barrier membrane 50, as seen in FIG. 7.

Due to flexible nature of the barrier membrane 50 (and second barrier membranes 60, 60' and 60"), as constant velocity joint 10 continues to rotate at higher speeds and the temperature within the constant velocity joint 10 increases, the grease and pressures continue to build up behind barrier membrane 50, causing barrier membrane 50 to expand into expansion space 54, leaving only minimal space D between inner surface 56 of end cap 22 and barrier membrane 50, as seen in FIG. 8.

The barrier membrane 50 expands in relation to the pressure and substantially fills expansion space 54. However, air, water, etc. that may have been present in expansion space 54 is vented through primary orifice 24 and/or secondary orifice 26. Because the barrier membrane 50 is substantially impermeable, contaminants cannot penetrate the barrier membrane 50 to contaminate the grease. In addition, the grease cannot leak from the constant velocity joint assembly 10 into the end cap 22 and vent through primary orifice 24 and/or secondary orifice 26. Thus, the grease within the constant velocity joint assembly 10 is conserved. The barrier membrane 50 also prevents grease from interacting with the boot 46, and thereby degrading and potentially causing premature failure. In addition, the use of such barrier membranes 50, 60, 60', and/or 60" still enables the constant velocity joint 10 to operate at any angle with no loss of grease. The barrier membranes 50, 60, 60', and 60" further cooperate to confine the grease to a smaller area within the constant velocity joint 10. Therefore, the overall amount of grease necessary to lubricate the constant velocity joint is considerably reduced. Use of the barrier membranes 50, 60, 60', and 60" also permit the constant velocity joint assembly 10 to be used in hostile environments with no detrimental effects.

In prior art constant velocity joint assemblies, when the constant velocity joint 10 is spinning at its high speeds, the boot 46 may rupture prematurely because there is no venting of the internal pressure of the joint 10. This rupture results in failures of the boot 46 and constant velocity joint 10. Current constant velocity joints tend to use a venting hole in the center of an end cap, which does equalize joint pressure but is insufficient in obstructing water and contaminants from entering the joint. Moreover, the venting hole is also easily plugged by the lubricant within the joint. Therefore, at high pressures and temperatures within the constant velocity joint the vent mechanism must be able to equalize the internal and external pressure differences while stopping the ingress of contaminants from entering the constant velocity joint.

In one embodiment of the disclosure, the use of orifices 24 and/or 26 on the end cap 22 allow air to flow freely in both directions to the inside and outside of the constant velocity joint assembly 10. However, the size of the orifices 24 and 26 on end cap 22 are sized so as to impede any water or contaminants that try to enter the constant velocity joint from the external environment.

The present disclosure has been described in an illustrative manner. It is understood that the terminology used is intended to be in the nature of words of description rather than of limitation. Many modifications and variations of the present disclosure are possible in light of the above teachings. Therefore, within the scope of the appended claims, the present disclosure may be practiced otherwise than as specifically described.

What is claimed:

1. A constant velocity joint assembly having a longitudinal axis, comprising:
    an outer race including a first axial end and a second axial end, the second axial end disposed axially relative to the longitudinal axis of the constant velocity joint between the first axial end and a flexible boot;
    an inner race supported within the outer race;
    a shaft engaging the inner race;
    a rolling element disposed between the inner race and the outer race;
    an end cap mounted to the first axial end of the outer race, the end cap including an inner surface and an outer surface, the inner surface disposed between the shaft and the outer surface, and a first axial end arranged adjacent the first axial end of the outer race and an opposite second axial end;
    a selectively expandable and contractible barrier membrane operatively mounted to the inner surface of the end cap, the barrier membrane is a flexible seal having no openings therethrough and being responsive to changes in pressure of a fluid during operation of the constant velocity joint assembly, wherein the entire barrier membrane is disposed axially relative to the longitudinal axis of the constant velocity joint between the first and second axial ends of the end cap;
    wherein an outer peripheral edge of the barrier membrane is attached to the inner surface of the end cap; and
    wherein the outer peripheral edge of the barrier membrane is displaced axially away from the outer race.

2. The constant velocity joint assembly of claim 1, wherein said barrier membrane is substantially impermeable.

3. The constant velocity joint assembly of claim 1, wherein the outer peripheral edge of the barrier membrane is disposed axially relative to the longitudinal axis of the constant velocity joint between the first and second axial ends of the end cap.

4. The constant velocity joint assembly of claim 1, wherein only the outer peripheral edge of the barrier membrane engages the inner surface of the end cap.

5. The constant velocity joint assembly of claim 1, wherein the first axial end of the end cap is attached to the first axial end of the outer race.

6. The constant velocity joint assembly of claim 1, further including a second selectively expandable and contractible barrier membrane arranged axially relative to the longitudinal axis of the constant velocity joint between the second axial end of the outer race and the flexible boot.

7. The constant velocity joint assembly of claim 6, wherein the second barrier membrane includes a sealing end that engages the shaft.

8. The constant velocity joint assembly of claim 6, wherein the second barrier membrane includes a first engagement portion, a barrier portion, and a second engagement portion, wherein the first engagement portion contacts the outer race and the second engagement portion engages the shaft.

9. The constant velocity joint assembly of claim 6, wherein the second barrier membrane is positioned internally between the rolling element and the flexible boot member.

10. A constant velocity joint assembly having a longitudinal axis, comprising:
    an outer race including a first axial end and a second axial end;
    an inner race supported within the outer race;
    a shaft engaging the inner race a rolling element disposed between the inner race and the outer race;
    a rolling element disposed between the inner race and the outer race;
    a flexible boot arranged adjacent the second axial end of the outer race, the second axial end of the outer race disposed relative to the longitudinal axis of the constant velocity joint between the flexible boot and the first axial end of the outer race;
    a boot support member connecting the flexible boot to the second axial end of the outer race; and
    a selectively expandable and contractible barrier membrane including a first end connected to the boot support member and a second end engaging the shaft, the barrier membrane is a flexible sealing body having no openings therethrough and being responsive to changes in pressure of a fluid during operation of the constant velocity joint assembly; and wherein the barrier membrane engages the boot support member at a first attachment point and the flexible boot engages the boot support member at a second attachment point, the first attachment point being disposed axially relative to the longitudinal axis of the constant velocity joint between the second attachment point and the second axial face of the outer race.

11. The constant velocity joint assembly of claim 1, wherein the end cap includes at least one orifice fluidly connecting an inner region at least partially defined by the inner surface of the end cap and an outer region at least partially defined by the outer surface of the end cap.

12. The constant velocity joint of claim 10, wherein the boot support member includes a first end arranged adjacent the second axial end of the outer race and a second end attached to the flexible boot, the first end of the barrier membrane disposed axially relative to the longitudinal axis of the constant velocity joint between the second axial end of the outer race and the first end of the boot support member.

13. The constant velocity joint of claim 10, wherein the flexible boot includes a first axial end and an opposite second axial end, the first axial end of the flexible boot being disposed axially relative to the longitudinal axis of the constant velocity joint between the second axial end of the outer race and the second axial end of the flexible boot, the first end of the barrier membrane being disposed axially relative to the longitudinal axis of the constant velocity joint between the second axial end of the outer race and the first axial end of the flexible boot, and the second end of the barrier membrane being disposed axially relative to the longitudinal axis of the constant velocity joint between the first and second axial ends of the flexible boot.

14. The constant velocity joint of claim 10, wherein the flexible boot includes a first axial end and an opposite second axial end, the first axial end of the flexible boot being disposed axially relative to the longitudinal axis of the constant velocity joint between the second axial end of the outer race and the second axial end of the flexible boot, and the second end of the barrier membrane being disposed axially relative to the longitudinal axis of the constant velocity joint between the second axial end of the outer race and the first axial end of the flexible boot.

15. The constant velocity joint of claim 14, wherein the first end of the barrier membrane is axially disposed between the second axial end of the outer race and the first axial end of the flexible boot.

* * * * *